United States Patent
Rossini et al.

(10) Patent No.: US 10,690,482 B2
(45) Date of Patent: Jun. 23, 2020

(54) DEVICE FOR MEASURING PARAMETERS OF A ROPE

(71) Applicant: REDAELLI TECNA S.P.A., Milan (IT)

(72) Inventors: Davide Rossini, Milan (IT); Giuliano Ambroset, Milan (IT)

(73) Assignee: Redaelli Tecna S.p.A., Milan (IT)

( * ) Notice: Subject to any disclaimer, the term of this patent is extended or adjusted under 35 U.S.C. 154(b) by 107 days.

(21) Appl. No.: 16/075,014

(22) PCT Filed: Sep. 20, 2016

(86) PCT No.: PCT/EP2016/072248
§ 371 (c)(1),
(2) Date: Aug. 2, 2018

(87) PCT Pub. No.: WO2017/140386
PCT Pub. Date: Aug. 24, 2017

(65) Prior Publication Data
US 2019/0063904 A1 Feb. 28, 2019

(30) Foreign Application Priority Data
Feb. 16, 2016 (IT) .................. 102016000015779

(51) Int. Cl.
*G01B 11/10* (2006.01)
*G01B 11/24* (2006.01)
*G01B 11/245* (2006.01)

(52) U.S. Cl.
CPC .......... *G01B 11/105* (2013.01); *G01B 11/245* (2013.01); *G01B 11/2433* (2013.01)

(58) Field of Classification Search
CPC ............. G01N 2201/062; G01N 21/31; G01N 21/274; G01N 33/49; G01N 2021/0321; G01N 2021/0389; G01N 21/0303; G01N 21/255; G01N 2201/0633; G01N 2201/0634; G01N 2201/0638; G01N 33/492; G01N 21/9501; G01N 2223/6116; G01N 23/201; G01N 21/21; G01N 21/359; G01N 21/47; G01N 21/4738; G01N 21/64; G01N 2201/061; G01N 15/0211; G01N 15/06; G01N 15/1459; G01N 2015/0046; G01N 2015/0065; G01N 2015/0693;
(Continued)

(56) References Cited

U.S. PATENT DOCUMENTS

| 7,773,225 B2 * | 8/2010 | Barea ................. B65H 63/0324 356/429 |
| 2005/0002036 A1 * | 1/2005 | Bae ..................... G01N 21/952 356/429 |

* cited by examiner

*Primary Examiner* — Michael P Stafira
(74) *Attorney, Agent, or Firm* — R. Ruschena Patent Agent, LLC

(57) ABSTRACT

Device (100) for continually and automatically measuring geometrical and shaping parameters of a rope (8) comprising a first plate (1) and a second plate (2) parallel to each other and constrained in a removable way by means of spacer means (3) and anchoring means (4), at least two micrometers (5, 6) angularly unaligned one to the other and positioned between said first plate (1) and second plate (2), an encoder (7) anchored to the second plate (2), in contact with the rope (8) being the device (100) wherein said first plate (1) and second plate (2) comprise a shaped opening (9) for the passage of the rope (8) inside said shaped opening, so that the rope (8) centrally flows through the device (100) and the two micrometers (5, 6) carry out the measurements.

7 Claims, 3 Drawing Sheets

(58) Field of Classification Search
CPC ... G01N 2015/1486; G01N 2021/0357; G01N 2021/1789; G01N 2021/217; G01N 2021/3513; G01N 2021/399; G01N 2021/4709; G01N 2021/4735; G01N 2021/4792; G01N 2021/635; G01N 2021/6484; G01N 2021/7736; G01N 2021/7786; G01N 2021/8416; G01N 21/17; G01N 21/211; G01N 21/251; G01N 21/253; G01N 21/272; G01N 21/3504; G01N 21/3563; G01N 21/39; G01N 21/4785; G01N 21/4795; G01N 21/49; G01N 21/51; G01N 21/645; G01N 21/648; G01N 21/65; G01N 21/76; G01N 21/7703; G01N 21/80; G01N 21/8422; G01N 21/88; G01N 21/8806; G01N 21/952; G01N 2201/06193; G01N 2201/0637; G01N 2201/08; G01N 2201/088; G01N 2201/12; G01N 2201/129; G01N 23/20; G01N 23/20008; G01N 23/20083; G01N 23/205; G01N 23/207; G01N 27/127; G01N 29/14; G01N 29/2418; G01N 29/2462; G01N 33/0031; G01N 33/0037; G01N 33/004; G01N 33/0042; G01N 33/0044; G01N 33/0047; G01N 33/0049; G01N 33/005; G01N 33/0054; G01N 33/0057; G01N 33/02; G01N 33/15; G01N 33/442; G01N 33/4833; G01N 33/491; G01N 33/52; G01N 33/728; G01N 9/00; G01N 33/49; G01N 21/0303; G01N 2201/0634; G01N 2021/217; G01N 2021/635; G01N 2021/7786; G01N 21/648; G01N 2201/08; G01N 29/2418; G01N 9/00; G01J 3/14; G01J 3/28; G01J 2003/2866; G01J 3/0202; G01J 3/0205; G01J 3/0208; G01J 3/0218; G01J 3/0286; G01J 3/0291; G01J 3/0297; G01J 3/10; G01J 3/42; G01J 2003/2826; G01J 3/2823; G01J 1/429; G01J 2003/104; G01J 2003/1269; G01J 2003/451; G01J 3/00; G01J 3/108; G01J 3/1838; G01J 3/1895; G01J 3/26; G01J 3/44212; G01J 3/447; G01J 3/45; G01J 3/453; G01J 4/00

See application file for complete search history.

DEVICE FOR MEASURING PARAMETERS OF A ROPE

BACKGROUND OF THE INVENTION

1. Field of the Invention

A device for continuous and automatic measuring of the geometric parameters of the steel rope and a measuring method associated therewith, comprising specifically a high frequency LED meter for in particular measuring diameter, pitch, straightness, ovality and undulation of a rope. Said device is also provided with a specially developed software in order to derive the geometrical parameters of ropes, starting from continuously read "raw" data from the heads of the LED meter.

2. Brief Description of the Prior Art

According to devices and known measuring systems, two-dimensional images of a portion of a wire or rope are taken and then converted in electrical image signals which are digitized and stored in an image memory.

With a computing unit the values of the property to be detected (e.g. rotation, protruding wires, etc.) are determined through the digital signals themselves.

Such measuring systems are still very time-consuming and in particular they are not able to perform measurements such as diameter, pitch, straightness, ovality and undulation continuously along the surface of a whole rope.

There is therefore the need for an innovation which allows to overcome the technical problems mentioned above and such device being able to guarantee a continuous measurement of the parameters of interest along a rope.

SUMMARY OF THE INVENTION

Subject of the present invention is therefore a device and a method for continuously and automatically measuring of the geometric parameters of a rope, specifically comprising a high frequency LED meter for measuring geometric parameters and the shape of a rope, such as for example, diameter, pitch, straightness, ovality and undulation. A first subject of the present invention is therefore a device for measuring the geometric parameters and the shape of a rope, as specified in the annexed independent claim. A second subject of the present invention is also a method for measuring geometric parameters and shape of a rope according to the annexed independent claim.

The dependent claims further describe particular and further advantageous details and aspects of the invention.

BRIEF DESCRIPTION OF DRAWINGS

This and other advantages of the invention will now be described in detail, with reference to the accompanying drawings in which.

DETAILED DESCRIPTION OF THE INVENTION

Figure 1:
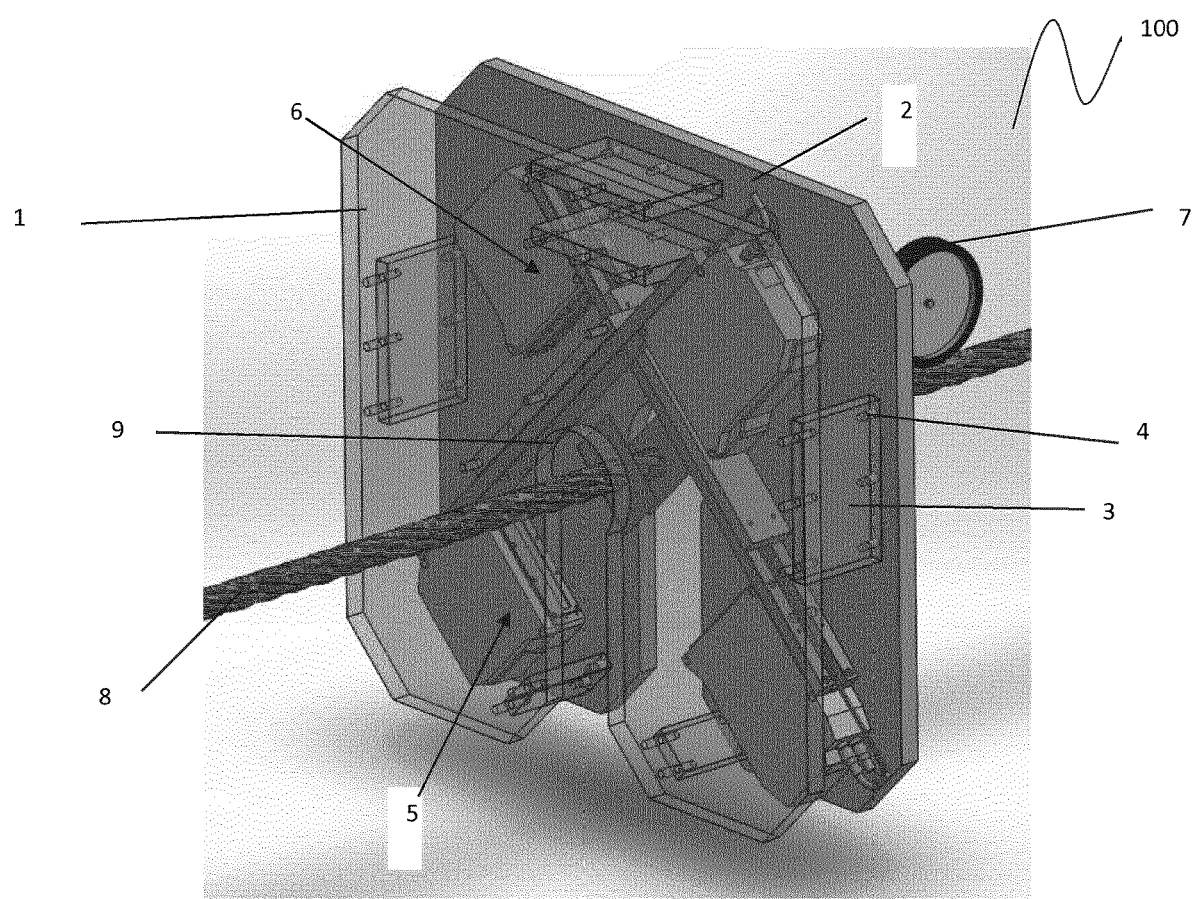
FIG. 1 shows an embodiment of a measuring device of the geometric parameters and the shape of the rope according to the invention.
Figure 2:
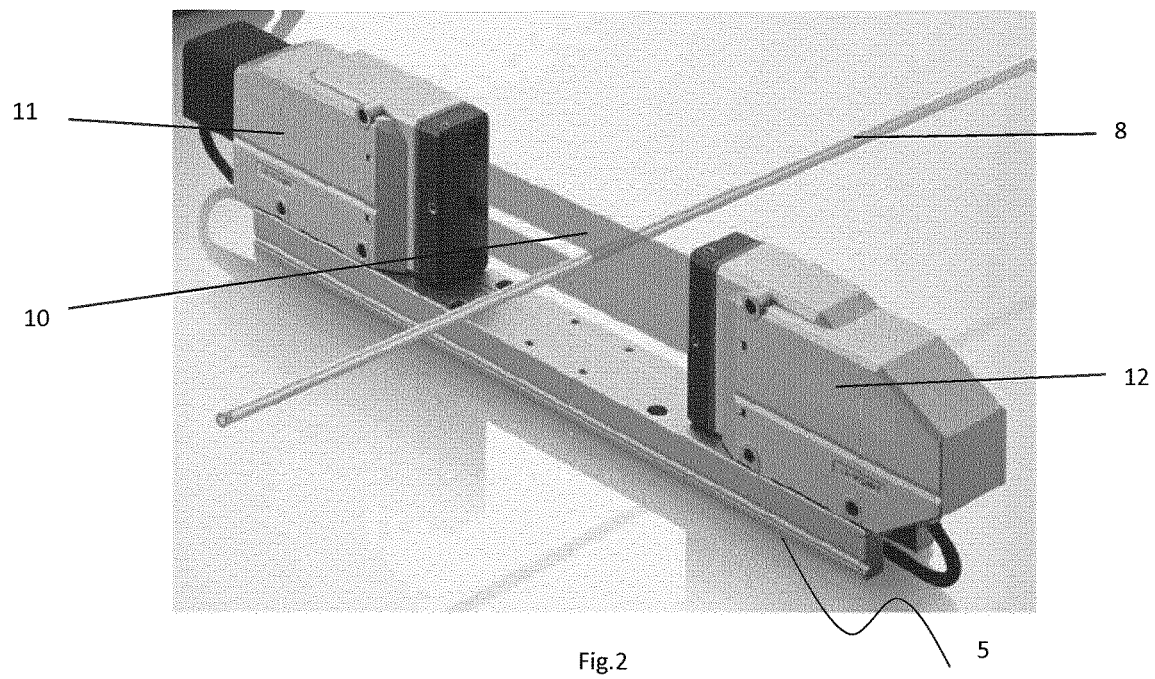
FIG. 2 shows a detail of a micrometer of the device of FIG. 1.

As shown on FIGS. 1 and 2, the subject of the present invention is a device 100 for continuously and automatically measuring of the geometric parameters and the shape of a steel rope comprising a first plate 1 parallel to a second plate 2, said plates being mutually bound in a removable manner through spacer means 3 and anchoring means 4, within which at least two micrometers 5, 6 are placed, which are angularly misaligned one to another and with an encoder 7 which is anchored to the second plate 2 and in contact with the rope 8. The plates 1, 2 have a rectangular face on which a contoured opening 9 is provided for the passage of the rope 8 to its interior. The device 100 is positioned on the rope by means of the opening 9.

Each micrometer 5, 6 shows a measure at each pulse of the encoder 7. The number of pulses is adjustable. Depending on the speed of the rope 8 and the setting of the encoder 7, each micrometer 5, 6 can transmit values up to the maximum frequency of the device.

As shown in FIG. 2, the micrometer 5, 6 comprises a transmitter 12 of a LED light and a receiver 11. The LED light, preferably green in color, is emitted as a uniform collimated beam by the transmitter. At the receiver 12 a sensor is present (of a known type and therefore not shown in the figures) which measures the height of the shadow created by an object placed in the middle of the LED beam and the distance of such shadow from the ends of the LED beam.

Figure 3:
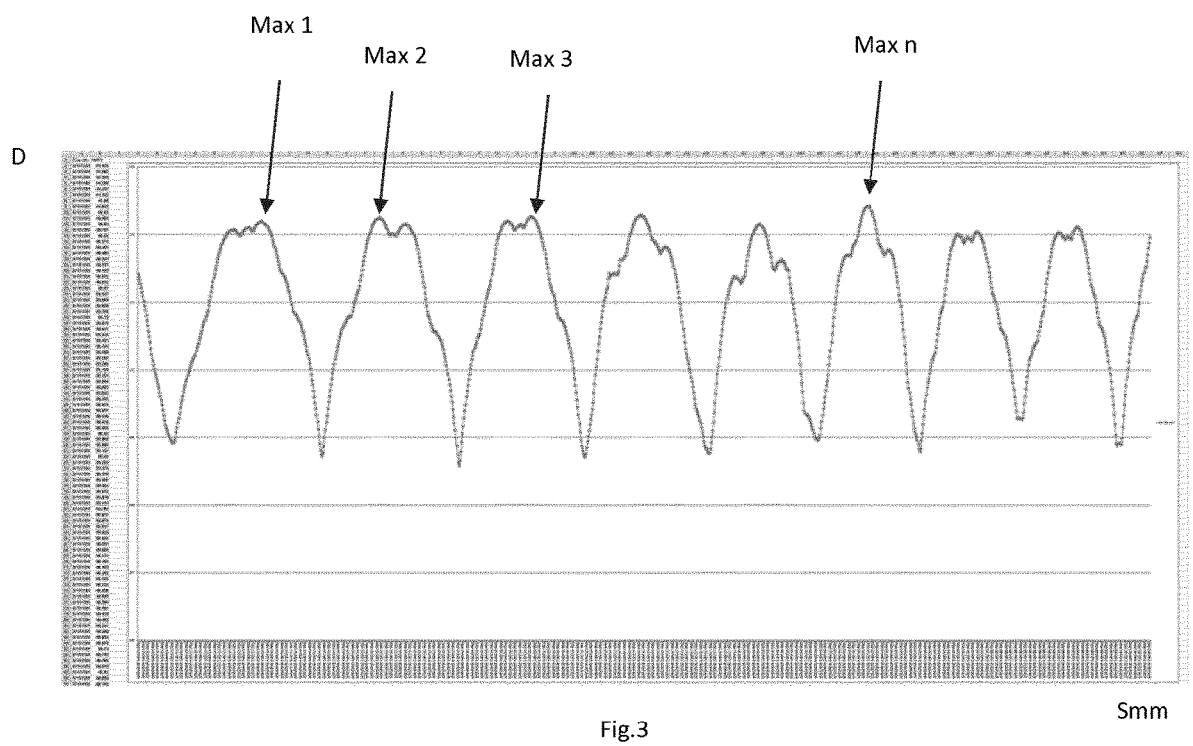
FIG. 3 shows a graph of data measured on a rope according to the subject of the present invention.

An example of a graph of the data measured on a rope at the production step is shown in FIG. 3. The graph shows on the abscissa axis the space in millimeter $S_{mm}$ and on the ordinate one the diameter measurements D and displays the measurements of the diameters of the rope collected with one of the micrometers 5, 6 as the rope 8 runs through the measuring device 100. The variation of the measure of the diameter of the rope shown in the graph is due to the geometry of the rope which is formed by strands.

Further subject of the present invention is a method for continuously and automatically measuring the geometric parameters of a steel rope by means of the device which is the subject of the present invention. Said method comprises the following steps:

placement of the device 100 on the rope 8; measurement of the geometric parameters of the rope through micrometers 5, 6; analysis of the acquired data. A specially designed software collects such data and analyzes the same continuously, and processes them in order to obtain the desired values. These values are continuously updated during the passage of the rope 8 inside the device 100, so as to monitor in real time all its geometric parameters.

Figure 5:
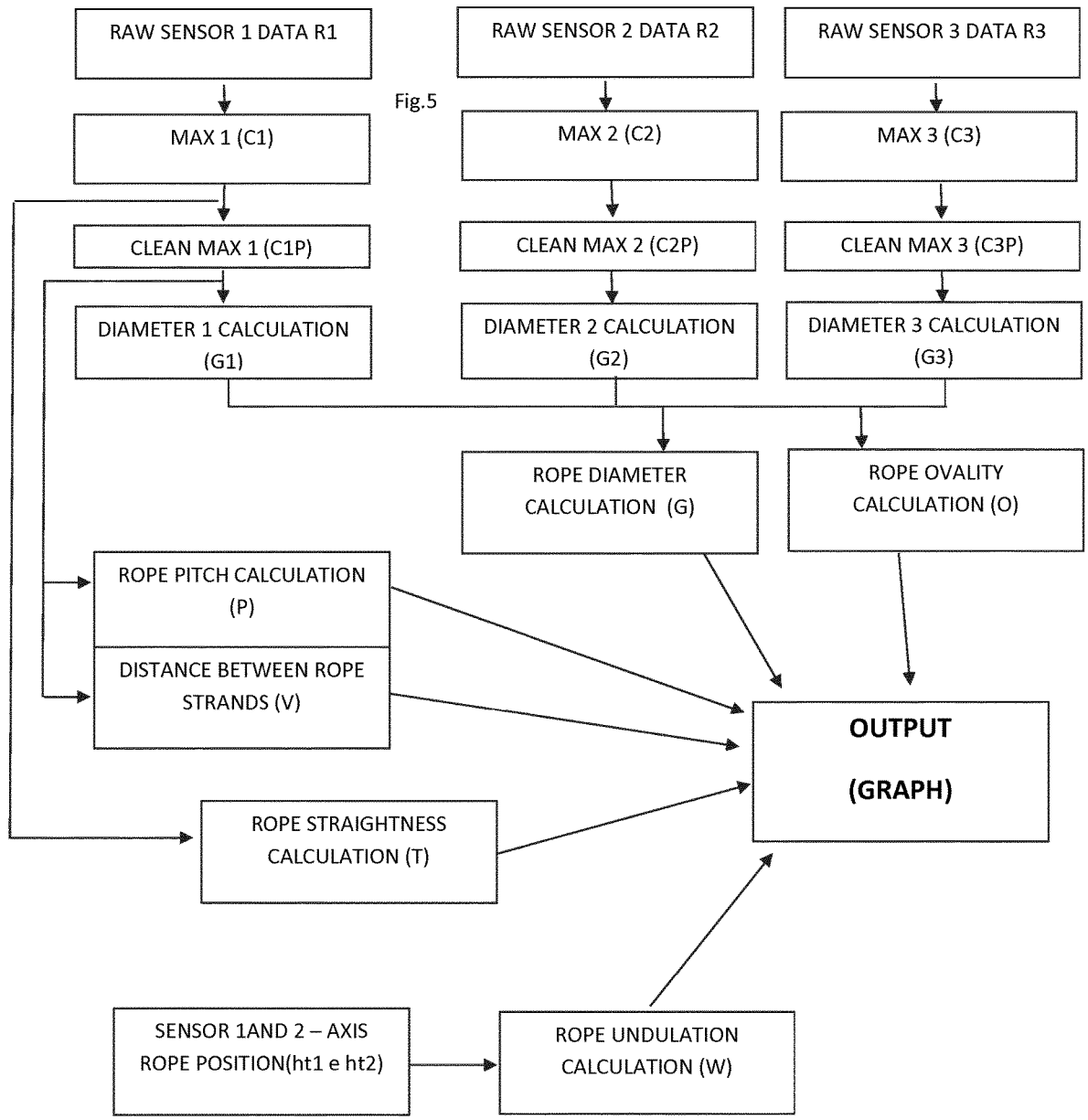
FIG. 5 shows a flowchart of the method for continuous and automatic measuring of geometric parameters of a rope according to the present invention.

In particular, the measurement of the geometric and shape parameters is illustrated in FIG. 5, with the following steps:

extraction of data vectors (R1, R2, R3) relating to the function of the position measurement of the diameter of the rope coming from the LED sensors (for example three in number);

extraction of the maximum diameter vectors (C1, C2, C3) by means of the data processing separately performed on each of the three series of LED sensors;

elimination of fictitious maximum values that can be wrongly detected obtaining true maximum diameters vectors (C1P, C2P, C3P);

extraction of the maximum diameter values (G1, G2 and G3);

calculation of the diameter (G) value as an average between the maximum diameter values (G1, G2 and G3);

calculation of ovality value (0) as the maximum of the absolute value of the differences between all pairs of maximum diameter values (G1, G2 and G3);

calculation of the value of the pitch (P) performed on only one of the vectors (C1P);

calculation of the straightness (T) performed on only one of the vectors (C1);

calculating undulation (W);

calculation of the distance between the strands (V);

generation of graphics output.

The diameter is read from the led sensor through a specific interface (USB or ethernet). According to an embodiment of the present invention, the detected diameters are two, one for each LED sensor connected to the controller. According to a further embodiment of the present invention, the detected diameters are three, and this is a further LED sensor connected to the controller. The data collection vectors are then respectively R1 ("Raw" data from sensor 1), R2 ("Raw" data from sensor 2) and eventually R3 ("Raw" data from sensor 3). This is detected by a third sensor, positioned at a certain distance (as a function of the cable pitch) from the first two sensors and then provides the data vector R3. The three vectors R contain not only the diameter data from the three LED sensors, but also their position (in space domain) calculated according to a vector V (because the sensors return values in the time domain).

To measure the diameter, the software simulates the action of a gauge caliper with plates, normally used for the measurement of the diameter of a rope. To this end, only the maxima of the obtained graph curves (FIG. 3) for both micrometers 5, 6, are considered.

The following process is carried out separately on each of the three series of sensors (on the raw values R1, R2 and R3) in which the absolute minimum and the absolute maximum are detected. They are then taken into account for the first series of the maximum values (the values C1, C2, C3), carrying out the measurements for the entire length of the rope. The same is repeated for the second and the third set of values.

The instantaneous measurement of the diameter of the micrometer 1 is the maximum among a plurality of Max which can be set as desired (that is, the width of the gauge plates, set by the user). The same applies for the micrometer 2, etc. The measure of the diameter of the rope at that point is the average value of the measures of the 2 micrometers. Such measure is updated for each gauge length in real time.

The software is also able to identify and "clean up" any wrong values detected on the surface of the rope, which, if taken into account, would jeopardize the correct identification of one or more maximum values, and then the measurement of the diameter of the rope (and the correlated quantities) obtaining true maximum values C1P, C2P, C3P.

Always according to the present invention, for the extraction of the diameter values, the three maximum values C1P, C2P and C3P are considered and are defined as G1, G2 and G3. Later, the average between G1, G2 and G3 is calculated, such value representing the rope diameter G at that point.

Furthermore, it is possible to simulate the width of the gauge plates, by considering any number among the maximum values, depending on the type and of the geometric characteristics of the analyzed rope. The measure of the diameter for rope with an odd number of outer strands follows the same mode, but in addition to that, the software multiplies the value obtained by the measurement by a geometric coefficient, suitably calculated in order to obtain the measure of the circumscribed circle (i.e. the diameter of the rope).

The pitch P measurement is performed through the pulses provided by the encoder, coupled to the device 100, by measuring the distances among the maximum values.

Figure 4:
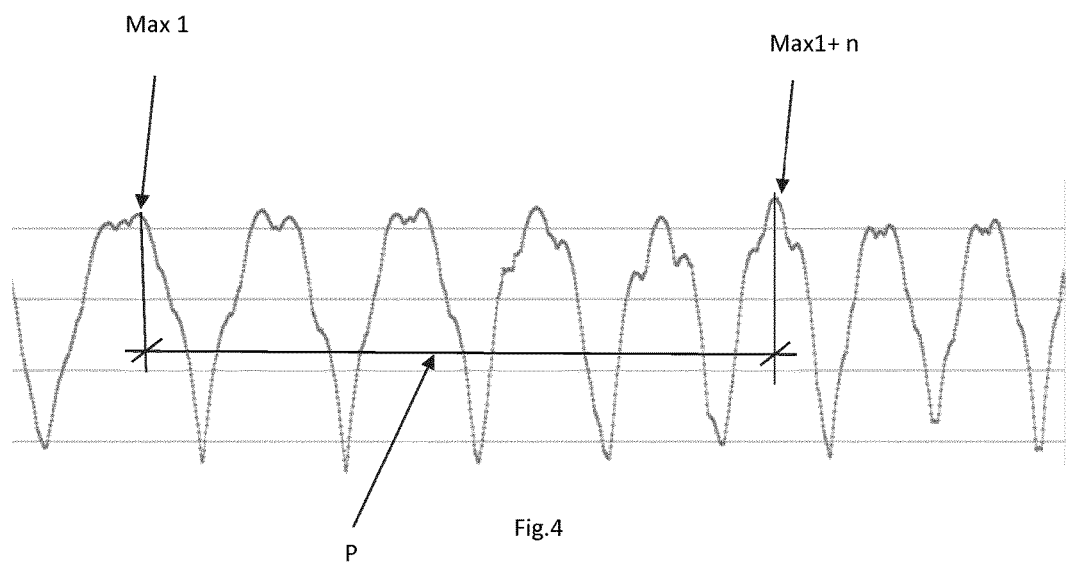
FIG. 4 shows a graph of the measurement of the pitch P performed on a rope according to the subject of the present invention.

Each maximum value corresponds to a strand of the rope. The rope is made of n strands, which are repeat themselves. The distance between Max1 and Max1+n represents the pitch P of the rope at that point (FIG. 4). The calculation is performed on only one of the vectors C, namely C1P.

The measure of the straightness is made by comparing all measured maximum values and must be made within a defined interval in order to ensure the uniformity of the rope. The software calculates the difference between the maximum values, taking into account the geometry of the strand which composes the rope. Each strand is in fact in turn made of several helically wrapped wires and the measure of its diameter varies according to the position of the wires in their layer. For each strand a geometric coefficient was calculated, used for the calculation of the straightness of the rope. The calculation is performed on only one of the vectors C, namely C1.

The measure of the ovality of the rope is made by a software which calculates the difference of the measures of the diameters of the rope, obtained from both micrometers at the same point, in other words, the ovality is calculated as the maximum of the absolute value of the difference between all vector pairs (G1, G2 and G3). The value obtained is then compared with the limits imposed by the operator.

The measure of the undulation during the stranding of the rope is made by positioning a second device at a certain distance from the first one. The software then calculates the difference between the absolute positions of the two profiles of the rope in the two devices, by distinguishing among any possible vibrations caused by the undulation of the rope.

A last parameter that the device is capable of monitoring is the correct spacing between the strands V, a parameter that ensures the proper functioning of the rope in operation. Moreover, the software is designed to give a warning signal to the operator in the event that the measured variables are not in conformity with the specifications of the rope.

Advantageously, the device 100 can be used both at a production site, or on the site of use. In addition to the modes of the invention as described above, it must be understood that there are many further variants. It must be understood that such implementation modes are only exemplar and do not limit the subject of the invention, its applications, or its possible configurations. On the other hand, although the description cited above makes it possible to an expert in the field to implement the present invention at least according to one of its exemplary configuration, it should be understood that numerous variants are of the described components are conceivable, without for this reason abandon the subject of 'invention, as defined in the appended claims, which must be interpreted literally and/or according to their legal equivalents.

The invention claimed is:

1. A device (100) for continually and automatically measuring geometrical and shaping parameters of a rope (8), comprising:

a first plate (1) and a second plate (2) parallel to each other and constrained in a removable using a spacer (3) and an anchoring device (4), at least two micrometers (5, 6) angularly unaligned one to the other and positioned between said first plate (1) and second plate (2), an encoder (7) anchored to the second plate (2), in contact with the rope (8) wherein said first plate (1) and second plate (2) comprise a shaped opening (9) for the passage of the rope (8) inside said shaped opening, so that the rope (8) centrally flows through the device (100) and the two micrometers (5, 6) carry out the measurements;

and wherein said measurements are carried out by using the device (100) to perform a method comprising the following steps:

positioning the device (100) on a rope (8);

measuring the geometric parameters of the rope (8) by two micrometers (5, 6);

analyzing the acquired data;

wherein said geometric and shaping parameters comprise the diameter, the pitch, the straightness, the ovality and the undulation of a rope;

wherein said geometric and shaping parameters measurement is performed according to the following steps:

extracting data vectors (R1, R2, R3) relating to the function of the position measurement of the diameter of the rope coming from the LED sensors;

extracting the maximum diameter vectors (C1, C2, C3) using the data processing separately performed on each of the three series of LED sensors;

eliminating fictitious maximum values that can be wrongly detected obtaining true maximum diameters vectors (C1P, C2P, C3P);

extracting the maximum diameter values (G1, G2 and G3);

calculating the diameter (G) value as an average between the maximum diameter values (G1, G2 and G3);

calculating ovality value (0) as the maximum of the absolute value of the differences between all pairs of maximum diameter values (G1, G2 and G3);

calculating the value of the pitch (P) performed on only one of the vectors (C1P);

calculating of the straightness (T) performed on only one of the vectors (C1);

calculating undulation (W);

calculating the distance between the strands (V);

generating graphics output.

2. The device (100) according to claim 1, wherein said micrometer (5, 6) comprises a LED transmitter (12) and a receiver (11).

3. The device (100) according to claim 2, wherein said LED transmitter (12) emits light as a uniform collimated LED beam.

4. The device (100) according to claim 2 wherein said receiver (11) comprises a sensor that measures the height of the shadow created by an object placed in the middle of the LED beam and the distance of such shade from the LED beam extremes.

5. A program for a computer comprising a software suitable to implement the method according to claim 1.

6. A product for a computer programs on which is stored the computer program according to claim 5.

7. A control unit comprising a controller, a data carrier associated with the controller and a program for a computer according to claim 5 stored in the data carrier.

* * * * *